(12) United States Patent
Zimmerman

(10) Patent No.: US 7,457,758 B2
(45) Date of Patent: *Nov. 25, 2008

(54) METHOD AND APPARATUS FOR GENERATING STANDARDIZED CARBON EMISSION REDUCTION CREDITS

(75) Inventor: Patrick Robert Zimmerman, Rapid City, SD (US)

(73) Assignee: South Dakota School of Mines and Technology, Rapid City, SD (US)

( * ) Notice: Subject to any disclaimer, the term of this patent is extended or adjusted under 35 U.S.C. 154(b) by 735 days.

This patent is subject to a terminal disclaimer.

(21) Appl. No.: 10/364,128

(22) Filed: Feb. 10, 2003

(65) Prior Publication Data

US 2004/0158478 A1    Aug. 12, 2004

(51) Int. Cl.
*G06Q 99/00* (2006.01)
*G06F 9/44* (2006.01)
*G06F 7/60* (2006.01)

(52) U.S. Cl. .................... 705/1; 705/7; 703/2

(58) Field of Classification Search .............. 705/1, 705/7, 8, 10, 11, 37, 26, 27, 22, 28, 29, 35, 705/36 R, 412; 702/19; 119/174; 47/58.1 R; 703/2, 5, 11, 12; 700/266
See application file for complete search history.

(56) References Cited

U.S. PATENT DOCUMENTS

| | | | | |
|---|---|---|---|---|
| 6,115,672 | A * | 9/2000 | Caveny et al. | 702/19 |
| 6,780,220 | B2 * | 8/2004 | Milbrath et al. | 75/602 |
| 6,782,321 | B1 * | 8/2004 | Burton | 702/5 |
| 2002/0143693 | A1 * | 10/2002 | Soestbergen et al. | 705/37 |
| 2002/0173980 | A1 * | 11/2002 | Daggett et al. | 705/1 |
| 2002/0194113 | A1 * | 12/2002 | Lof et al. | 705/37 |
| 2003/0083819 | A1 * | 5/2003 | Rooney et al. | 702/5 |
| 2003/0164069 | A1 * | 9/2003 | Milbrath et al. | 75/709 |
| 2004/0039684 | A1 | 2/2004 | Sandor | |
| 2004/0088179 | A1 * | 5/2004 | Cogen et al. | 705/1 |
| 2006/0184445 | A1 * | 8/2006 | Sandor et al. | 705/37 |

FOREIGN PATENT DOCUMENTS

WO    WO 2004/010366 A2 *    1/2004

OTHER PUBLICATIONS

"The Sky's Not the Limit" The Emerging Emissions Trading Markets (Draft) Carbon Trade Watch; a project of the Transnational Institute; Aug. 2002; Total 29 pp.*

IPCC Good Practice Guidelines and Uncertainty Management in National Greenhouse Gas Inventories; Chapters 5, 6 and 7; Accepted by the IPCC Plenary May 1, 2000.

(Continued)

*Primary Examiner*—Igor N. Borissov
(74) *Attorney, Agent, or Firm*—Hogan & Hartson LLP

(57) ABSTRACT

This invention generally relates to a method and apparatus for determining carbon emission reduction credits and, more particularly, to a method and apparatus for generating and quantifying standardized carbon emission reduction credits. General data and site-specific data, if available, are input into a carbon sequestration model to determine the approximate change in the level of carbon compounds stored in a media, such as soil, over a specified period of time. An uncertainty analysis is conducted on the results to quantify and normalize carbon emission reduction credits. Standardized carbon emission reduction credits may be compiled for trade and other carbon emission reduction credits are placed in reserve.

37 Claims, 4 Drawing Sheets

OTHER PUBLICATIONS

E. Vine, et al., "The Monitoring, Evaluation, Reporting and Verification of Climate Change Projects", *Mitigation and Adaptation Strategies for Global Change*, 4:43-60, © 1999 Kluwer Academic Publishers, Belgium.

W.J. Parton, et al, "Observations and Modeling of Biomass and Soil Organic Matter Dynamics for the Grassland Biome Worldwide", *Global Biogeochemical Cycles*, vol. 7, No. 4, pp. 785-809, Dec. 1993.

U.S. Appl. No. 11/200,889; Office Action; Mailing Date Nov. 16, 2006.

U.S. Appl. No. 11/200,889; Amendment; Filing Date Mar. 20, 2007.

U.S. Appl. No. 11/200,889; Notice of Allowance; Mailing Date Jun. 6, 2007.

EXHIBIT B; "The South Dakota Carbon Sequestration Project"; C-Lock public website Home Page; http://www.hpcnet.org.org/clock; 2001; South Dakota School of Mines & Technology; South Dakota, US.

EXHIBIT B(1); "What is C-Lock?"; http://www.hpcnet.org/cquest/whatisclock; 2001; South Dakota School of Mines & Technology; South Dakota, US.

EXHIBIT B(2); "What is carbon sequestration?"; http://www.hpcnet.org/cqwest/whatis; 2001; South Dakota School of Mines & Technology South Dakota, US.

EXHIBIT B(3); "C Lock Statistics"; 2001; South Dakota School of Mines & Technology; South Dakota, US.

EXHIBIT B(4); "Log-in"; 2001; South Dakota School of Mines & Technology; South Dakota, US.

EXHIBIT B(5); "Create New Account"; 2001; South Dakota School of Mines & Technology; South Dakota, US.

EXHIBIT B(6); "Marketing Credits"; 2001; South Dakota School of Mines & Technology; South Dakota, US.

EXHIBIT B(7); "What's new?"; http://www.hpcnet.org/whatsnew; 2001; South Dakota School of Mines & Technology; South Dakota, US.

EXHIBIT C; "The South Dakota Carbon Sequestration Project Home Page"; http://beta.hpcnet.org.org/clock; 2001; South Dakota School of Mines & Technology; South Dakota, US.

EXHIBIT C(1); "C-Lock Registration"; Beta system account registration; 2001; South Dakota School of Mines & Technology; South Dakota, US.

EXHIBIT C(2); "Disclaimer for registration"; 2001; South Dakota School of Mines & Technology; South Dakota, US.

A.S. Donigan, et al. "Assessment of Alternative Management Practices and Policies Affecting Soil Carbon in Agroecosystems of the Central United States"; Apr. 1994; Environmental Protection Agency; Athens, GA.

"Summary Report for the Workshop on Monte Carlo Analysis"; U.S. Environmental Protection Agency; Risk Assessment Forum; May 14-16, 1996; pp. 1-420; New York, NY.

"Evaluating the Uncertainty of Emission Estimates Final Report"; Jul. 1996; vol. VI, Chapter 4; Radian Corporation; North Carolina.

S. Mooney, et al. Contracting for Soil Carbon Credits: Design and Costs of Measurement and Monitoring; May 9, 2002; Montana State University; Bozeman, MT.

J.M. Antle, et al. "Designing Efficient Policies for Agricultural Soil Carbon Sequestration"; Montana State University; Feb. 5, 2001; pp. 1-31; Bozeman, MT.

J.M. Antle, et al. "A Comparative Examination of the Efficiency of Sequestering Carbon in U.S. Agricultural Soils"; pp. 1-20.

IPCC; "Good Guidance and Uncertainty Management in National Greenhouse Gas Inventories"; web page description for report; chapters 1-4, 8 annexes; http://www.ipcc-nggip.iges.or.jp/public/gp/english; May 2000.

T.E. Graedel, et al. "A Compilation of Inventories of Emissions to the Atmosphere"; Global Biogeochemical Cycles; Mar. 1993; pp. 1-26; vol. 7, No. 1.

D. Bosseboeuf, et al. "Cross-country comparison on energy efficiency indicators: the on-going European effort towards a common methodology"; Energy Policy; Elsevier Science Ltd.; 1997; pp. 673-682; vol. 25, No. 7-9; Great Britain.

S. Bocchi, et al. "Application of factorial kriging for mapping soil variation at field scale"; European Journal of Agronomy; 2000; pp. 295-308; vol. 13; Elsevier Science B.V.

J.J. Brejda, et al. "Distribution and Variability of Surface Soil Properties at a Regional Scale"; Soil Sci, Soc. Am. J.; 2000; pp. 974-982; vol. 64.

R.T. Conant, et al. "Grassland Management and Conversion into Grassland: Effects on Soil Carbon"; Ecological Applications;; 2001; pp. 343-355; vol. 11, No. 2; Ecological Society of America.

P.J.J. Desmet, et al. "A GIS procedure for automatically calculating the USLE LS Factor on topographically complex landscape units"; Journal of Soil and Water Conversion; Sep.-Oct. 1996; pp. 427(7); vol. 51, No. 5; Soil & Water Conversion Society.

J.S. Kern, et al. "Conversion Tillage Impacts on National Soil and Atmospheric Carbon Levels"; Soil, Sci. Soc. Am. J. 1993; pp. 200-210; vol. 57.

J.J Landsberg, et al. "A generalised model of forest productivity using simplified concepts of radiation-use efficiency, carbon balance and partitioning"; Forest Ecology and Management; 1997; pp. 209-228; vol. 95; Elsevier Science B.V.

W.J. Parton, et al. "Division S-3-Soil Microbiology and Biochemistry—Analysis of Factors Controlling Soil Organic Matter levels in Great Plains Grasslands"; Soil Sci. Soc. Am. J; 1987; pp. 1173-1179; vol. 51.

W.J. Parton, et al. "Dynamics of C, N, P, and S in Grasslands Soils: A Model"; Biogeochemistry; Element Interactions in Terrestrial Ecosystems; 1988; pp. 109-131; vol. 5. No. 1; The J Stor Archive.

K.E. Saxton, et al. "Estimating Generalized Soil-water Characteristics from Texture"; Soil Sci. Soc. Am. J., Jul.-Aug. 1986; pp. 1031-1036; vol. 50.

E.L. Vine, et al. "The Monitoring, Evaluation, Reporting, Verification, and Certification of Energy-Efficiency Projects"; Mitigation and Adaptation Strategies for Global Change; 2000; pp. 189-216; Kluwer Academic Publishers; vol. 5; Netherlands.

T.O. West, et al. "A synthesis of carbon sequestration, carbon emissions, and net carbon flux in agriculture: comparing tillage practices in the United States"; Agriculture Ecosystems & Environment; 2002; pp. 217-232; vol. 91; Elsevier Science B.V.

* cited by examiner

METHOD AND APPARATUS FOR GENERATING STANDARDIZED CARBON EMISSION REDUCTION CREDITS

FIELD OF THE INVENTION

This invention generally relates to a method and apparatus for determining standardized carbon emission reduction credits and, more particularly, to a method and apparatus for generating, quantifying and confirming standardized carbon emission reduction credits and reserve carbon emission reduction credits.

BACKGROUND OF THE INVENTION

An accelerating rate of change in the amounts of trace gases in the earth's atmosphere has the potential to modify the earth's energy balance, which may result in a variety of consequences. These trace gases are often referred to as greenhouse gases and include carbon dioxide. Although there is disagreement concerning the potential threats or benefits of this change, there is widespread agreement in the global community that it is prudent to enact policies to attempt to slow down the rate of change. At the same time, research is underway to predict the consequences of increasing greenhouse gas concentrations and to develop the technology to economically limit those increases. All current protocols have established emission reduction targets that define 1990 as the base year and specify reductions as a fractional percentage of emission rates during that base year.

The increasing concentration of greenhouse gases in the atmosphere is a global issue. For example, carbon dioxide emitted from a power plant into the atmosphere has a lifetime of approximately 100 years and may be distributed globally. As a result, at least for the issue of atmospheric greenhouse gases, the geographic location where the greenhouse gases are removed from the atmosphere is less important than the fact that they are removed.

One of the key provisions of many national strategies to limit the rate of growth in the amounts of atmospheric greenhouse gases is the concept of emissions trading. Emissions trading is a process whereby specific target emission rates of certain greenhouse gases are set for specific industries. A member of the industry who achieves measured emissions below the target rates may trade the difference on the open market to another who exceeds, or forecasts that it will exceed, its own emission targets. An entity responsible for measured emissions above its target rates may be subject to fines or other sanctions. The objective is to reduce the overall emission of greenhouse gases in the atmosphere, even if the emissions of one particular source are not decreased, or indeed are increased.

The unit of measure of tradable carbon emissions that has been generally accepted is commonly known as the Carbon Emission Reduction Credit, or CERC, which is equivalent to one metric ton of carbon dioxide gas (or other greenhouse gas equivalent) that is not emitted into the earth's atmosphere due to a human-caused change. That is, a CERC can be generated for human activities that have occurred since 1990 that have resulted in a reduction of business-as-usual emissions of greenhouse gases.

For example, CERCs can be generated through energy efficiency gains of fossil fuel technology, substitution of biofuels for fossil fuels, or removal of greenhouse gases from industrial gas streams. CERCs also can be generated by sequestration of atmospheric carbon dioxide into land or water, e.g., by reforesting land or through implementation of agricultural practices that increase the storage of organic matter in the soil.

A market is emerging for trading CERCs. One type of CERC trading involves an industrial consortium, where each industrial entity determines a rough estimate of the number of CERCs generated by its activity or needed from others due to its activity. If an individual entity has generated CERCs by changing its business-as-usual activity, e.g., by reducing the amounts of greenhouse gases emitted, it can trade the CERCs to others in the consortium.

There also have been entities involved specifically in CERC trading based on increasing the storage of carbon in soil. For example, in 1999 a consortium of Canadian power companies hired an insurance company to contractually obligate a group of Iowa farmers to twenty years of no-till farming. Based on general data, a broker for the power companies assumed that this land management practice would result in sufficient sequestration of carbon into the soil to generate CERCs. The power companies also purchased an insurance policy for protection against the possibility that no CERCs, or insufficient CERCs, would be generated by this arrangement. This trade was designed by the consortium of power companies to minimize the price that the farmers were paid. The difficulty and uncertainty of predicting these CERCs, obtaining indemnification or insurance, and banding together a sufficiently large number of farmers to generate a pool of potential CERCs large enough to overcome substantial baseline transactional costs and uncertainty whether the CERCs generated would meet current, pending or future regulatory requirements operated to drive up the costs incurred by the potential CERC purchasers, drive down the price paid to the producers and generally make it difficult to establish and engage in a market for CERCs.

Existing natural resource-based methods to trade CERCs generally share a number of shortcomings. Typically, the contracts specify certain land management practices, but do not require a certain number of CERCs to be generated. The estimated CERC values are highly variable and minimized due to uncertainties caused by using general regional data to try to estimate CERCs and by high transactional costs. Without a reasonably accurate method of quantifying CERCs generated, it is difficult for all to place a fair value on the trade. Also, trades generally have been designed and instigated by a potential CERC purchaser, or an entity representing one, and not by the CERC producer, such as a farmer or landowner. Further, each trade must be individually designed by the CERC purchaser to be consistent with current and anticipated legislative requirements and to maximize the likelihood that CERCs will be generated. Competition is also limited by the requirement of projects large enough to achieve economies of scale. As a result, the price paid to CERC producers is driven down and the market for trading CERCs is limited.

In the absence of an accepted process to generate, quantify and standardize CERCs, especially CERCs generated or projected to be generated by carbon sequestration in land or plants, the market for such CERCs remains relatively primitive, inefficient and uncertain. The existing attempts to identify and trade CERCs suffer from difficulties in quantifying accrued and projected CERCs, high administrative costs in quantifying and indemnifying accrued and projected CERCs, and the lack of a market for individuals and individual entities to effectively engage in CERC trades. These problems particularly restrict the ability of an individual landowner, or groups of landowners, to efficiently generate, quantify, standardize, market and trade CERCs.

As such, a need exists for an improved method of generating, quantifying and standardizing CERCs, particularly so that a relatively smaller producer of CERCs, such as an individual landowner or groups of landowners, may be able to reliably and efficiently participate in a market for CERCs by generating and quantifying standardized CERCs by a method capable of adapting to meet a broad range of regulatory specifications.

DESCRIPTION OF THE INVENTION

Figure 1:
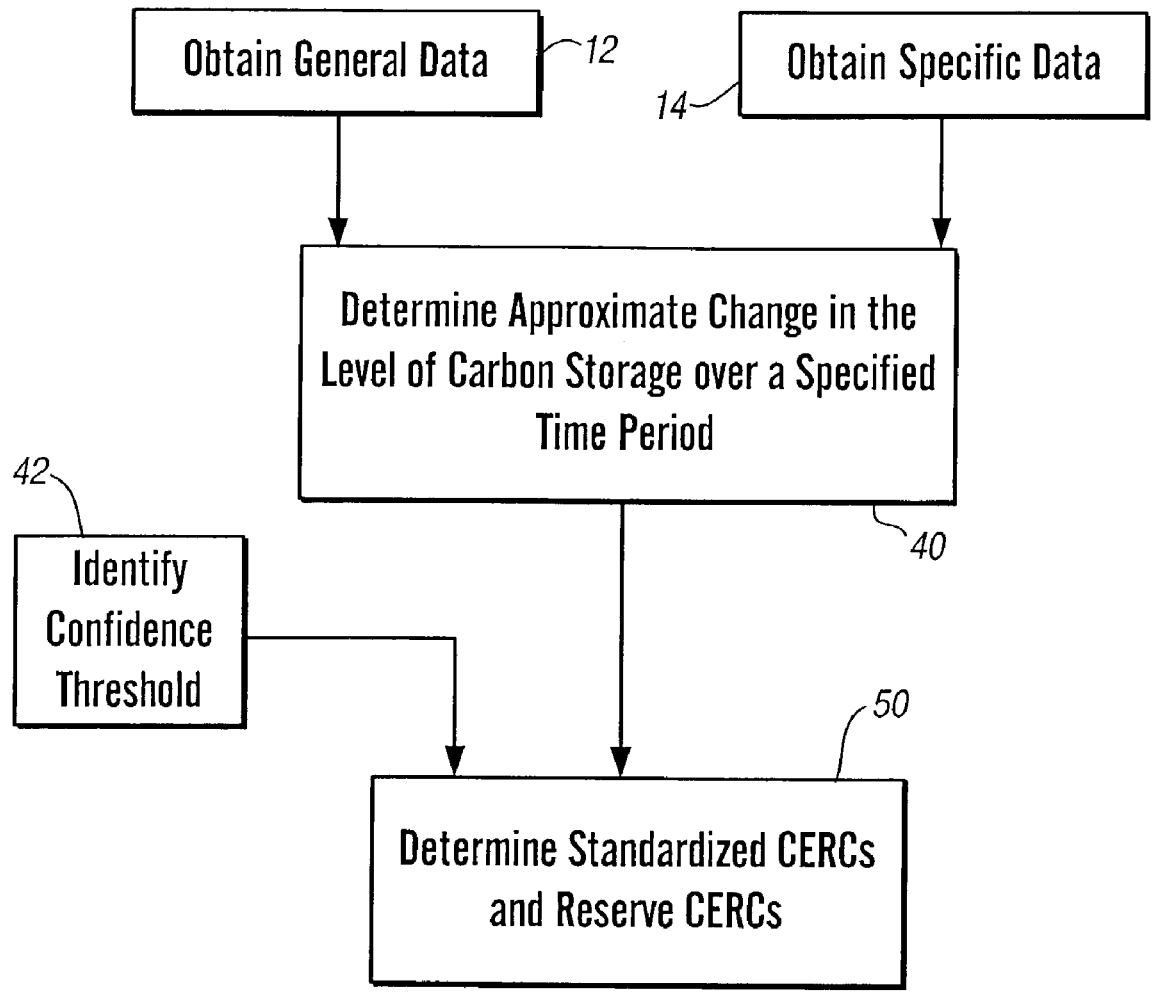
FIG. 1 is a flow chart depicting one embodiment of the invention to generate standardized carbon emission reduction credits and reserve carbon emission reduction credits.

This invention generally relates to a method and apparatus for determining standardized carbon emission reduction credits and, more particularly, to a method and apparatus for generating, quantifying and confirming standardized carbon emission reduction credits and reserve carbon emission reduction credits.

In general, there are six elements of a CERC: 1) a baseline of emissions of specific greenhouse gases as a result of business as usual activities; 2) additivity; 3) permanence; 4) leakage; 5) ownership; and 6) verification. The business as usual baseline generally refers to the level of greenhouse gas emissions from continuing current management practices in that particular industry. In the case of farmers, business as usual typically is defined as conventional tillage agriculture, but may be specifically determined for each land parcel based on the land management history. Further, the business as usual baseline may be defined as an average of a larger community, rather than a business as usual for an individual or a single entity.

The second element is additivity, which generally refers to human activity that causes a reduction in business as usual emissions. That is, the change between the level of greenhouse gas emissions under the business as usual baseline and the lower level of emissions must be caused by human intervention. In the case of farmers, this typically means changing land management away from the business as usual practice of conventional tillage agriculture. Even with crops removing carbon dioxide from the air, conventional tillage agriculture typically results in a net release of carbon dioxide into the air due to oxidation of carbon compounds contained in the soil. In general, as tillage intensity decreases, thereby decreasing the amount of soil exposed to the oxygen in ambient air, carbon turnover also decreases, resulting in a decrease in the net carbon dioxide emissions into the atmosphere. A change to minimum tillage, or to no tillage at all, typically results in less carbon dioxide emitted or even a net sequestration of atmospheric carbon. A change from cropland to grassland can result in the sequestration of substantial amounts of carbon dioxide in the form of organic carbon compounds that can accumulate in grassland soils. Human activity other than, or in addition to, changing land management away from conventional tillage agriculture may also be employed to cause a reduction in business as usual emissions.

The third element is permanence. The general objective of emissions trading is to reduce atmospheric concentrations of greenhouse gases to allow time to develop the technology to decrease emissions into the atmosphere directly from the source. In this case, permanence typically is defined as the storage of carbon dioxide in the form of biomass or soil organic carbon for a time period specified by regulation, typically twenty or thirty years. Generally, residence times for carbon removed from the atmosphere by forests can exceed decades, whereas soil carbon can have residence times that exceed hundreds to thousands of years.

The fourth element is absence of leakage, which generally means that the changed human activity intended to generate a CERC does not result in an undesirable increase in greenhouse gas emissions in any part of the biogeochemical cycle. In the case of carbon sequestration, CERCs are more valuable if the landowner can demonstrate that the changed human activity that resulted in generation of the CERCs does not result in increased emissions of other gases, such as nitrous oxide or methane, as compared to business as usual emissions.

Another element to maximize the value of a CERC is documentation of ownership. That is, the entity offering to trade or sell a CERC must demonstrate that it is the owner of rights to the CERC. Although this typically will be the landowner-operator in the case of soil carbon sequestration, other scenarios are possible, e.g., where by agreement or operation of law another has rights to use all or part of the land.

Yet another requirement is verification, which generally refers to the ability of a third party to verify the generation of the CERC through an approved accounting process. Verification typically requires that the process employed be transparent, i.e., the process is documented so that a third party may review, analyze, understand and replicate it. For example, verification may include audits of data to ensure accuracy. The CERC value generally will be maximized where the process employed to establish the CERC directly corresponds to the method of verification.

Direct measurement of the absolute amount of carbon sequestered in a given parcel of land is difficult and expensive. Further, the absolute amount of carbon in a specific soil sample may be highly variable for samples collected at individual points within the parcel of land, due to the mean residence time of organic matter in soils often being on the order of 1,000 years and due to soil characteristics often being quite spatially variable. Therefore, it may not be practical to obtain an accurate, precise, reproducible, cost effective direct measurement of the relatively small amount of carbon added to, or subtracted from, a land parcel over a period of several years to decades, the time periods required by current and pending legislative protocols.

This invention recognizes that, although the total amount of carbon in a specific soil sample may be quite variable, the incremental carbon stored as a result of specific land management practices over periods of decades is much less variable, particularly since most soils have been tilled in the past, at least in the United States and much of the industrialized world. This is because previously tilled soils contain levels of organic carbon that are much lower than their organic carbon saturation levels and therefore carbon storage over periods of decades is relatively insensitive to soil carbon variability.

This invention also recognizes that, to generate and quantify accrued and projected CERCs with reasonable accuracy, it is not necessary to measure the total organic content of the entire soil profile, or even the absolute amount of carbon added to, or subtracted from, the soil since 1990. Rather, this invention recognizes that standardized CERCs may be generated and quantified by estimating the incremental carbon stored in the soil over time, e.g., since 1990.

This invention further recognizes that carbon sequestration can be conceptualized as a national issue, which allows one to reconcile aggregate sequestration estimates with continental-scale carbon flux estimates. That is, by compiling CERCs from a number of landowners, one may more readily generate and quantify accrued and future CERCs with reasonable accuracy for the compilation than for a single or smaller group of landowners. Therefore, the allocation of CERCs from the compilation to individual land parcels need not precisely accurate. However, to be fair to the individual landowner, the quantification system used should be transparent, reproducible, traceable and verifiable.

One embodiment of the invention is directed to generating and quantifying standardized CERCs for a parcel of land through the use of general data for a given region encompassing the parcel of land by utilizing a carbon sequestration model and an uncertainty analysis. That is, it would not be necessary to have detailed, long term site-specific data for a parcel of land. Preferably, the general data for the region dates back as far as possible, more preferably back to approximately 1900 and the region is as small a geographic region as possible, such as a county in the United States. If available, site-specific data also may be used. More preferably, site-specific data from 1990 to date is used, along with the general data, to determine the standardized CERCs and reserve CERCs through a carbon sequestration model and uncertainty analysis.

Figure 3:
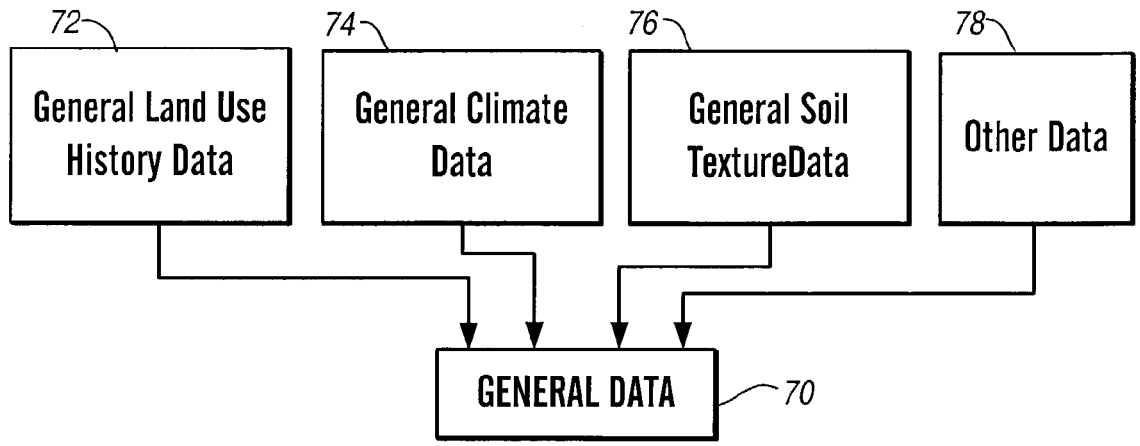
FIG. 3 is a flow chart depicting data components of site-specific data used to generate standardized carbon emission reduction credits and reserve carbon emission reduction credits of one embodiment of the invention.
Figure 4:
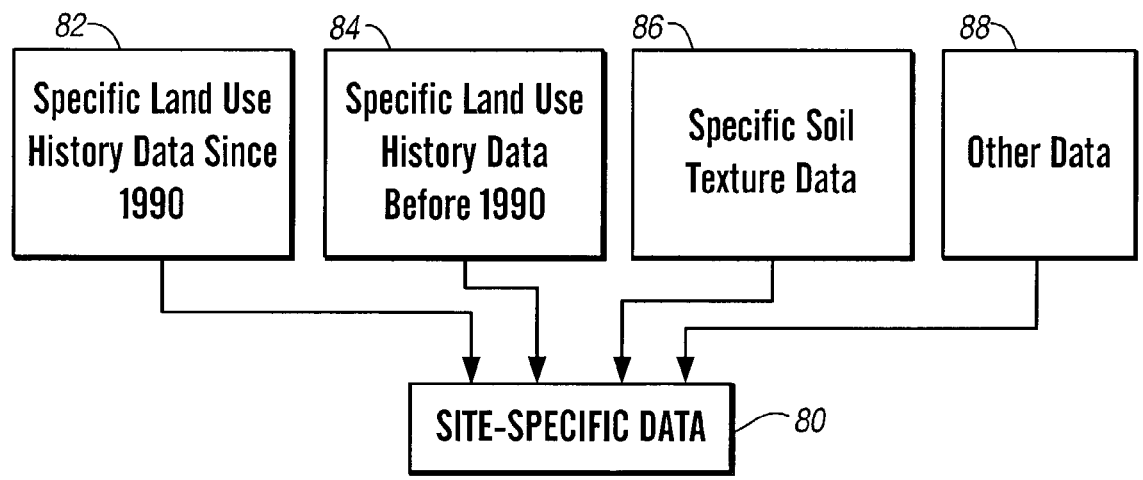
FIG. 4 is a flow chart depicting data components of general data used to generate standardized carbon emission reduction credits and reserve carbon emission reduction credits of one embodiment of the invention.

Referring to FIG. 1, one embodiment of the invention is depicted by a flow chart showing a method of generating standardized CERCs and reserve CERCs. General data is obtained 12, preferably from a database containing geographically referenced data relevant to carbon sequestration in soil. As shown in FIG. 3, such general data 70 may include one or more of general land use history data 72, general climate data 74, general soil texture data 76 and other data 78. Site-specific data 14 preferably also is obtained, more preferably from the landowner or other rights holder to the parcel of land. As shown in FIG. 4, site specific data 80 may include one or more of recent specific land use history data 82, preferably since 1990 or other year from which standardized CERCs are desired to be generated, less recent specific land use history data, preferably from before 1990 or other year from which standardized CERCs are desired to be generated, specific soil texture data 86 and other data 88. General data 12, preferably with at least some site-specific data 14, are used to determine the approximate change in the level of carbon storage in a media over a specified time period 40 through the application of a carbon sequestration model. A confidence threshold is identified 42 and the standardized CERCs and reserve CERCs are determined 50 through the application of an uncertainty analysis. The method can be employed to generate standardized CERCs and reserve CERCs accrued over a specific time period, such as from 1990 to date, and/or project standardized CERCs and reserve CERCs based on projecting certain general data and site-specific data for a specified time period.

Figure 2:
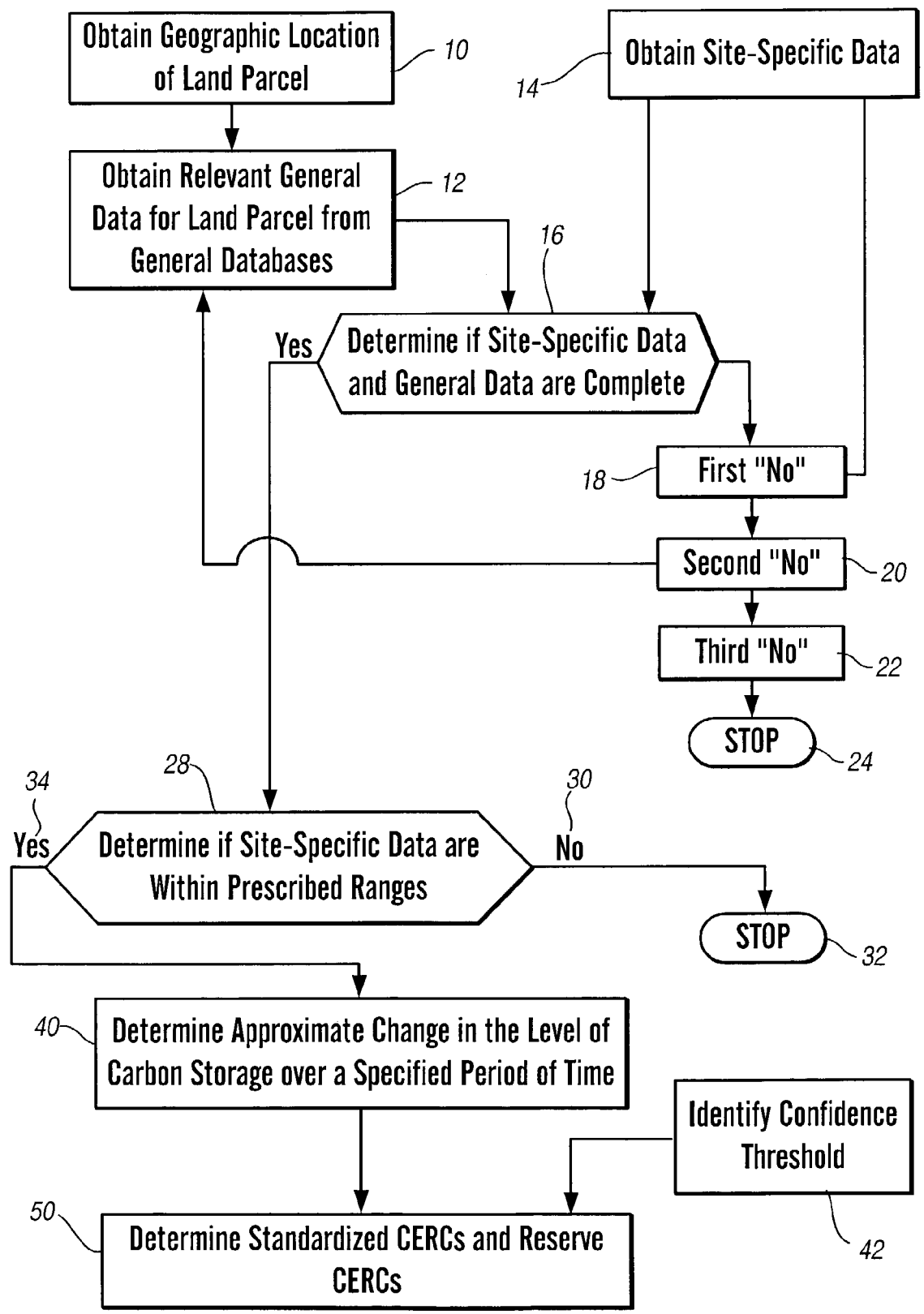
FIG. 2 is a flow chart depicting another embodiment of the invention to generate standardized carbon emission reduction credits and reserve carbon emission reduction credits.

Alternatively, as shown in FIG. 2, the geographic location of the land parcel is obtained 10 and used to obtain relevant general data for that land parcel from data stored in a database containing geographically referenced data relevant to carbon sequestration 12.

Also as shown in FIG. 2, the general data and/or the site-specific data alternatively may be tested. One such test 16 may be to determine if the general data and the site-specific data is sufficiently complete to allow the method to generate standardized CERCs. A first negative response 18 preferably initiates a request to obtain additional site-specific data 14. A second negative response 20 preferably initiates a request to obtain additional relevant general data for the land parcel from the general database 12. A third negative response 22 preferably initiates a stop command 24. A positive response 26 allows the method to continue.

Another test 28 that may be conducted is to determine whether site-specific data are within prescribed ranges or values of possible responses. A negative response 30 preferably initiates a stop command 32. A positive response 34 allows the method to continue.

In another embodiment of the invention, a combination of elements can provide an integrated system to generate and quantify standardized CERCs. These elements can include a systematic approach for gathering and managing data, a modeling component for estimating CERCs based on available information, a scenario module to help landowners develop best management strategies for generating CERCs, a system to quantify the uncertainty and risk, and strategies for auditing and verifying data inputs that are consistent with current, pending and future greenhouse gas emissions legislation.

Yet another embodiment of the invention, a method is employed 1) to generate and quantify standardized CERCs that have accrued over a specific time period, such as from 1990 to the present date, and/or 2) to generate and quantify standardized CERCs that are projected to exist from the present date to a specific date in the future, based on land management practices or other commitments by the landowner, and/or 3) to advise a landowner of standardized CERCs that would be projected to exist based on commitments to one or more land management practices.

International greenhouse gas emission reduction protocols, such as the Kyoto Protocol, typically specify 1990 as the base year upon which to establish greenhouse gas emission reductions. Therefore, CERCs can be generated by demonstrating human-caused incremental carbon storage since 1990 compared to business as usual emissions. To estimate the incremental amount of carbon stored in the soil since 1990 for a specific land parcel, it is preferred to determine the available carbon reservoir, if any, of the soil from the identified land parcel. That is, it is preferred to determine whether the land parcel contains essentially all the carbon it is capable of containing, or whether the soil has a capacity to store additional carbon. If the carbon reservoir is not full, the land parcel may be amenable to land management practices to increase carbon storage and thereby demonstrate the element of additivity. The soil carbon reservoir need not be determined precisely, since the sequestration rate of carbon into soil is relatively independent of how much carbon is in the reservoir, as long as it is not full.

Several different carbon models are available to determine the available carbon reservoir, if any, within the soil and/or vegetation located on a particular land parcel. The type and level of detail of the required data are dependent on the carbon model employed, although typically such data may be characterized as general and site-specific. General data may include any data that has an impact on sequestration of atmospheric carbon and that is not necessarily specific to a particular land parcel, and preferably includes crop behavior, soil response, carbon behavior and calibration, as well as typical soil texture and land use referenced by geographic region or location. Site-specific data may include any data about the specific geographic site in question that has an impact on sequestration of atmospheric carbon, and preferably includes climate data, soil texture and land use history directed to the specific parcel of land.

For example, crop behavior refers to the impact of particular crops in increasing carbon storage in soil, which is readily available for typical crops, such as corn or soybeans. Climate data may include historical records of temperatures, precipitation, winds, etc., which is widely available in the United States through a variety of sources, such as the National Weather Service. The soil texture for a given geographic location can be determined in a number of ways, such as testing or public records, preferably by reference to NRCS, SSURGO data and/or STATSGO data.

Land use history generally refers to the land management practices employed over a period of years. Land use history data may be characterized as general land use history data and site-specific land use history data. General land use history data may be typical and average data for a geographic area encompassing the parcel of land, such as a nation, state, or preferably a county in the United States, and may include typical practices in the given geographic area, such as types of crops, tillage methods, fertilization, irrigation, grazing, planting and harvesting practices, and other practices affecting carbon sequestration. General land use history data may be available from national, regional, state, county and local sources, such as the U.S. Department of Agriculture and other federal agencies, individual state agencies and county extension offices and other local sources.

Land use history data may also be characterized as site-specific, which may include the actual land management practices employed on that land parcel during specified time periods, e.g., types of crops, tillage methods, fertilization, irrigation, grazing, planting and harvesting practices, and other practices affecting carbon sequestration. Preferably, specific land use history data for a land parcel can be obtained from information provided by the landowner or, alternatively, from other historical sources, such as government and historical records, or from both sources.

Preferably, a numerical model known as CSU Century, developed at Colorado State University, is employed. CSU Century is a well accepted numerical modeling computer program designed to generally predict how much carbon is sequestrated in various ecosystems over time. It was developed originally for grassland ecosystems, but has been found to be accurate for a wide range of ecosystems, ranging from the tropics of Africa to the Boreal regions of Canada. The CSU Century program generally requires extensive data regarding land use history, climate and soil texture, among other things.

As noted, the invention recognizes that standardized CERCs may be generated and quantified without calculating the absolute amount of carbon in the soil profile. Rather, the incremental carbon stored in the soil over time, and especially since 1990, may be approximated. This recognition greatly simplifies the analysis by allowing the use of less detailed and less complete data, particularly as the time period in question lengthens.

For example, when used to determine the total organic carbon reservoir of an area of land, the CSU Century program generally requires extensive and detailed land use history data over relatively long periods of time, including, among other things, the types of crop, the amounts of fertilizer and when applied, the types and frequency of cultivation, irrigation amounts and when applied, organic matter additions, grazing systems, planting and harvesting dates, and the types of harvest. These data are gathered together as schedule files for use in the Century program. The present invention simplifies the use of carbon sequestration models by, among other things, recognizing that relevant data from greater than 100 years ago may be relatively general and incomplete, data from approximately 1900 to 1990 preferably may be more specific and more complete than the older data, but need not necessarily be so, and data from 1990 to date preferably may be relatively even more specific and even more complete.

Preferably, general data regarding typical land management practices, climate and soil texture from approximately 1900 through at least 1990 can be collected from national, regional, state, county and/or other local public records, compiled and converted into detailed schedule files to create a general database. Preferably, the general database contains general data relevant to carbon sequestration and referenced by geographic information, such as by nation, state, country, longitude, latitude and/or other geographic reference. General data from 1990 to date also may be collected and compiled in the database.

The data in the general database more preferably can be compiled independently of individual landowner input or data and can generate a generic land use history for selected regions or locales. Such a generic land use history may have several uses. For example, generic land use histories can be used to define the ranges of plausible responses that are likely to be given by individual landowners within the geographic region. If landowner responses fall outside of these prescribed ranges, the response can be targeted for verification and auditing. Also, if site-specific data are unavailable or incomplete for a given landowner in that geographic area, general data may be used to substitute for or supplement site-specific data. A generic land use history based on general data for a particular region alternatively could be used for all of the land use history for a given land parcel within the region.

Preferably, the general database may provide much of the data required by the carbon sequestration model to determine the available carbon reservoir, if any, and to generate and quantify standardized CERCs, both accrued and future. It is particularly advantageous for the general database to contain sufficient data for the time period prior to 1990 for the carbon sequestration model to determine the available carbon reservoir, if any. With public records providing the data for the time period prior to 1990, verification of resulting CERCs is simplified and expedited and the documentation requirements placed on the landowner are significantly reduced, thereby reducing barriers for the landowner to engage in the CERC market and increasing the value of such engagement by reducing uncertainty.

Site-specific data, preferably from the landowner, also may be used for certain land use history since 1990, such as the types of crops, tillage, fertilizer, irrigation, organic matter and grazing since 1990. More preferably, the landowner can provide and document detailed site-specific data, such as the crop type, the type and time periods of tillage, the type, amount and time periods of fertilization, the type, amount and time periods of irrigation, the type, amount and time periods of organic matter additions and the type and number of animals grazing, if any. Most preferably, the available information is provided for relatively short time intervals, such as by month. The landowner provided site-specific data also may be converted to detailed schedule files and stored in a data base.

To supplement or substitute for missing, incomplete or less accurate site-specific data, general data may be used, preferably from the general database. As the site-specific data are less accurate and/or less complete, the resulting CERCs will have a greater uncertainty, resulting in fewer standardized CERCs being generated and quantified, as described below. Similarly, if certain site-specific data are not available from either public records or the landowner, general data may be substituted, at the cost of increasing the fraction of CERCs held in the reserve pool.

Inputting the general data and available site-specific data into the carbon sequestration model can provide an initial analysis of whether or not the carbon reservoir of a land parcel is full and define the net carbon flux for the business as usual scenario. If this analysis shows the possibility of additivity, then more specific and more recent data from 1990 may be used, if available, to determine incremental carbon storage for the period beginning in 1990 to the year of the analysis.

Similarly, the incremental carbon to be stored in the soil into future years may be projected, preferably based on the data already inputted, e.g., based on continuing current land use practices previously input and based on entering variables not dependent on landowner behavior, such as long term weather projections. Also, the potential for storing incremental carbon into the future also may be projected by changing at least one variable that is dependent on landowner behavior, e.g., land use practices, particularly those associated with increasing carbon storage in soils.

In a preferred embodiment, future carbon storage can be determined based on the landowner providing alternative land use management practices that could be employed into the future. The relative carbon sequestration potential for each potential land use management practice can be determined by the methods described above and reported to the landowner. More preferably, the carbon sequestration potential for each alternative land use management practice can be determined through the use of a look-up table consisting of a series of scenarios that have been pre-analyzed for regionally important variables. Even more preferably, the landowner may provide such alternative land use management practices through an interactive media that is capable of identifying certain variables, offering alternatives to one or more variables, generating and quantifying standardized future CERCs based on the selected alternatives and providing a report. The results preferably can be used by the landowner to assess variables to maximize the generation of CERCs and their value.

After the quantity of accrued and projected incremental carbon storage is determined, the results may be subjected to an analysis to check the data and the modeling. Preferably, the data provided by the individual CERC producer can be analyzed to verify that the data is within expected or prescribed ranges. Data found to be outside of such ranges can be flagged for independent verification and auditing.

The results also may be subjected to an analysis of uncertainty. This invention recognizes that the use of an uncertainty analysis can allow the use of general data for input variables into carbon sequestration models to determine the approximate change in the level of carbon compounds in soil over specified time periods. The use of general data in such models is particularly advantageous for data for years dating back into time, such as prior to 1990 and back as far as 1900 or earlier, for which site-specific data may be difficult or impossible to document.

The uncertainty analysis allows one to quantify the relative level of uncertainty in the results of the sequestration model and express it as standardized CERCs and reserve CERCs, as explained in more detail below.

An uncertainty analysis generally performs a number of simulation runs in which certain key input variables are allowed to range across a distribution of reasonable values. The results for each simulation then can be compiled and compared to determine the potential range of variation in carbon sequestration due to uncertainties in the input data. For example, an uncertainty analysis generally takes a given range of the input data and determines a range of possible results.

Preferably a Monte Carlo uncertainty analysis is employed, although a variety of other methods may be used. In a Monte Carlo uncertainty analysis, input variables that affect the result are randomly assigned values that follow a particular distribution, such as Gaussian, although other distributions may be used, if more appropriate. A number of simulations are conducted, each time again randomly assigning values to the key input variables. From the results accumulated from the simulations, the actual distribution U of values arising from the uncertainty in the key variables can be determined. If, for example, the actual distribution U is Gaussian, a mean value X and a standard deviation S may be determined using standard statistical equations. X and S define a distribution of possible CERC values for that land parcel. According to the properties of a Gaussian distribution, X is considered the most probable value and S defines a spread of possible values around the mean.

To quantify the number of standardized CERCs for a land parcel, a confidence threshold C may be defined in terms of the standard deviation of the calculated Monte Carlo distribution and expressed as a probability, $P=f(C)$, that the standardized CERCs will actually be stored in the soil. For example, if C is chosen to equal 0.95, then for a normal two-tailed Gaussian distribution, $f(0.95)=2S$ and the standardized CERCs would be equal to $X-2S$, and the reserve CERCs would be equal to $2S$. In that example, one may characterize the standardized CERC in terms of being 95% confident that one metric ton of carbon is or will be actually stored in the soil The actual threshold C used in commercial practice may vary, e.g., for different applications, for different collections of CERC producers, for different potential CERC purchasers and other variables. The preferred threshold C is approximately 0.90 or higher.

One advantage of this approach is that the analysis may be immediately set up using standard Gaussian input distributions, but the expected distributions of input variables may be refined over time as more data becomes available, such that the distribution of random values may mimic more closely the distribution of values likely to actually occur.

In general, as the number of Monte Carlo simulations increases, the accuracy of the results increases. Preferably, a complete uncertainty analysis is conducted on each parcel of land to best characterize the uncertainty associated with that land parcel. Preferably, approximately 100 to approximately 1,000 small runs are conducted. Test results have shown that 800-1,000 simulation runs produce a stable distribution of results. Additional or different simulations can be run to further improve the accuracy of the results, particularly as computing technology continues to improve. However, current system constraints may limit the number of simulation runs per land parcel and other factors may reduce the number of simulation runs that can be conducted. Additional test results have shown that approximately 200 simulation runs for each land parcel can produce an uncertainty distribution similar to the results of 1,000 simulation runs and thereby provide a reasonable estimate of uncertainty for individual land parcels. This preferred embodiment of approximately 200 simulation runs currently provides a reasonable balance between accuracy and practicality, while still providing a customized uncertainty analysis for each parcel of land.

In addition to the uncertainty analysis for each parcel of land, additional uncertainty analyses may be conducted to improve the reliability of the results and to better understand the uncertainty distribution U, among other things. Again, a Monte Carlo uncertainty analysis is preferred, wherein the results for one or more of the land parcels may be subjected to a similar analysis, but with a greater number of simulations, more preferably approximately 1,000 simulation runs. A greater number of simulations, conducted repeatedly for many landowners, can provide information on the form of U and assist in choosing the preferred function to calculate $P=f(C)$, all as would be recognized by one skilled in the art.

In addition, these additional simulation results may be compared with the results for 200 simulation runs. From each 1,000 simulation runs, subsets of 200 simulation runs may be extracted to determine and compare their statistical means and standard deviations to those of the 1,000 simulation runs. This data preferably may be used to determine the amounts by which the results of a 200 simulation run set differs from the results of a 1,000 simulation run. For example, if a 200 simulation run subset is found to typically underestimate the uncertainty range by 2%, that variation may be added to the uncertainty calculated for each land parcel.

Land parcels may be randomly selected for these 1,000 simulation runs, although preferably each land parcel is selected. Using current technology on a single workstation, approximately 10 sets of 1,000 simulation runs can be run in one day. Depending on the number of landowner registrations received per day, this may result in as few as several percent or as many as 100% of landowners could be selected for full analysis. Additional workstations may be dedicated to running these simulation runs, if necessary or desirable. Preferably, a minimum of approximately 5% of all land parcels would be subjected to these 1,000 simulation runs.

Additional audits may be conducted. For example, selected input data may be compared with satellite imagery or Farm Service Agency records to independently confirm land use histories. For example, a landowner's assertion that corn had been planted on a land parcel during a specific year dating back to approximately 1980 may be verified by selected landsat images. Candidates for this type of auditing preferably would be identified by specific indicators, such as certain landowner responses falling outside of expected ranges, e.g., as established by the general database. Some candidates also could be selected at random.

Although carbon sequestration is sensitive to many variables, those variables have been shown to be definable fairly accurately. In tests conducted according to the invention, data for sample parcels of land in South Dakota generally have resulted in an uncertainty of approximately 5% for most runs conducted on the key variable of soil texture. Other uncertainties, such as future climatic variables, can be evaluated as part of the uncertainty analysis and generally will tend to be additive.

From the results of the uncertainty analysis, a fraction of the CERCs generated may be standardized and identified as available for trade, with the remaining CERCs placed in reserve. For example, if the total uncertainty calculated were approximately 5%, preferably approximately 95% of the CERCs generated would be certified as standardized CERCs available for trade and the remaining approximately 5% would be placed into a reserve pool. In that example, if 100 CERCs had been calculated, then up to 95 standardized CERCs could be certified for trade and 5 CERCs would be included in the reserve pool. In the future, as data and carbon sequestration certification technology improves, the reserve pool preferably may be reduced. Conversely, if future climate change or other factors caused the uncertainty to increase, the reserve pool preferably may be increased. The actual percentage variation is currently being determined by uncertain analysis and may be greater than the above example of 5%. Through this process, each CERC certified and traded may be standardized, such that it is equal in value regardless of where it was generated. That is, a standardized CERC generated and quantified by the present invention may be a tradable commodity.

The CERCs can then be compiled for trade, preferably in an open market to a variety of potential CERC purchasers. Preferably, additional standardized CERCs from one or more other CERC producers, from a variety of sources and geographic locations, can be additively pooled to increase the size and value of the compilation. Through such a system of the present invention, CERC generators and CERC purchasers can more readily communicate and evaluate the availability of CERCs of demonstrated quality and quantity, resulting in a lower risk to the CERC purchaser, higher price to the CERC generator and a more equitable result for all involved.

The quantity of incremental carbon storage that was initially calculated, but determined to not meet the established standards for a CERC certified for trade, may be identified and retained in a reserve or indemnification pool. Preferably, these results and the underlying data are maintained and combined in the indemnification pool with similar results and data from other landowners. This process preferably may reduce or eliminate the need for CERC purchasers to buy relatively expensive insurance for protection against the carbon storage being less than expected.

The standardized CERCs, whether accrued or projected, also may be subjected to confirmation or testing. This invention recognizes that, by collecting and offering for trade a collection of CERCs generated by land use management of a number of landowners over a relatively larger geographic area, the aggregate reduction of business as usual greenhouse gas emissions need only be independently confirmed, e.g., by regulatory agencies. That is, the accuracy of CERC generation for an individual parcel of land within that aggregate generally would not be an issue to the CERC purchaser. Generally, as the land area increases, the testing for CERC generation becomes easier, more accurate and more cost efficient. For example, CERCs generated over a several hundred or several thousand square mile region are more readily susceptible to testing, such as by reconciling with ambient carbon dioxide concentrations and isotopic tracer techniques.

For the global CERC market, the potential CERC purchaser is concerned that the number of CERCs actually has been, or will be, generated to the satisfaction of the applicable governing bodies. Currently, this typically requires independent verification to determine that the method to generate and quantify the CERCs is transparent and repeatable. In the long run under current protocols, the aggregate carbon balance of an entire nation would be validated based on independent assessment technology. In the case of carbon sequestration, the validation would likely be based on the results of intensive long term research at selected research sites and it is unlikely that each parcel of land, or a random selection of parcels of land, would be tested. Currently such a process would be difficult scientifically and not feasible economically for each CERC trade. However, additional technological and scientific improvements could change those dynamics to allow individual or random verification. Such advances can be readily incorporated to generate and quantify standardized CERCs according to the present invention.

In another embodiment of the invention, standardized CERCs may be generated and quantified by identifying categories of information to determine the relative level of carbon sequestration, obtaining available information, estimating the change in carbon storage in a selected media since 1990, estimating the change in carbon storage in selected media into the future depending on certain input variables, conducting an uncertainty analysis and quantifying standardized CERCs.

In a preferred embodiment of the invention, individual CERC producers can register and provide site-specific data regarding carbon sequestration, the producer provided site-specific data may be combined with general data from a general database of previously acquired information, and input into a carbon sequestration model, incremental carbon storage can be calculated that has been previously generated and/or that is projected to be generated, the calculated result can be subjected to an uncertainty analysis to quantify the number of CERCs that meet an established standard of certainty, the standardized CERCs can be collected into a primary pool with standardized CERCs from other landowners, other incremental carbon storage can be collected into a reserve pool with similar results from other landowners, and the primary pool can be marketed to potential CERC purchasers. As data and/or analyses is improved or updated, incremental carbon storage from the reserve pool may be released to the primary pool. This invention allows an individual landowner, or a group of landowners, to generate, quantify, certify, market and trade standardized CERCs, both accrued and projected.

For the example of an individual or individual entity landowner, the landowner preferably may identify the parcel of land and receive an advisory report that quantifies possible accrued and/or future standardized CERCs, based on the previously stored general data in the database. Alternatively, the landowner may be requested to provide available site-specific data in response to particular inquires regarding the land and land use history in order to generate a more customized advisory report. Preferably, the advisory report would include the number of accrued standardized CERCs determined to be available for trade and the quantity of reserve CERCs. Alternatively, the landowner can select to change one or more of the input variables regarding future land management practices and receive a report that includes projections of future standardized CERCs based on the one or more changed input variables. The landowner preferably may conduct multiple analyses to better assess the impact of certain land management practices on CERC generation.

In another embodiment of the invention, a method to generate and quantify standardized CERCs includes obtaining selected information from at least one landowner, obtaining selected information from a data base, inputting selected information from the landowner and from the data base into a carbon sequestration model to determine the approximate change in the level of carbon sequestered in the land parcel over a specified time period, conducting an uncertainty analysis on the results and providing a report to the landowner.

Information from a landowner preferably is obtained through an interface, which may be any media through which the landowner may identify the geographic location of the land at issue and optionally input other data, such as land use history data, relevant to carbon sequestration. For example, the interface may involve the landowner manually completing written forms, verbally responding to inquiries, forwarding other documentation or information, otherwise providing requested data or combinations thereof.

In a preferred embodiment, the interface comprises an automated inquiry and response system, allowing the landowner to input certain information in response to certain inquiries. For example, the interface preferably would request the landowner to identify the landowner, the parcel of land and other site-specific data relevant to carbon sequestration. More preferably, the results from the landowner interface are compared with a database containing general data, and optionally site-specific data, relevant to generating and quantifying standardized CERCs to identify missing, incomplete or mis-entered data and to request additional information.

The interface also preferably requests site-specific data regarding the land and land use history of that parcel of land, including the actual land use practices employed during specific time periods, e.g., types of crops, tillage, fertilizer, irrigation, etc., as described in more detail above. More preferably, detailed and documented site-specific data is requested on a monthly basis for each year dating back to at least 1990.

In a more preferred embodiment, the interface includes a website accessible to a potential CERC producer that facilitates the data input from the potential CERC producer. Additionally, the website preferably includes additional information and reference material, such as background information regarding carbon sequestration and the global CERC market, current news relevant to CERC markets, a description of the process employed to generate and quantify standardized CERCs and the indemnification pool, a compilation of statistics relating to CERCs, and a compilation of accrued and projected CERCs from other CERC producers.

The database may be any compilation of data relevant to sequestration of atmospheric greenhouse gases and preferably includes a compilation of geographically referenced information. Preferably, the database contains both site-specific data and general data that have an impact on sequestration of atmospheric greenhouse gases. As described above, site-specific data preferably includes climate, soil texture and land use history, among other things, and general data preferably includes crop behavior, soil response, carbon behavior and calibration, among other things. More preferably, the general data can be obtained from public records and placed in a format referenced or indexed by geographic location.

The site-specific data from the landowner and the relevant general data from the database can be input into a carbon sequestration modeling program to determine the available carbon reservoir, if any, in the particular parcel of land and the incremental carbon stored in the land since 1990. Again, preferably the CSU Century program is employed to make this determination.

The information from the landowner may be entered into the carbon sequestration modeling program in a variety of ways, preferably data input is automated and more preferably data input is automated through a website accessible to the landowner. In one embodiment of the invention, the system receives site-specific data from the landowner, determines or obtains the geographic location of the parcel of land, identifies the site-specific data, if any, and the general data relevant to that parcel of land stored in the database, identifies the business as usual scenario for the land parcel and submits the collected information to the carbon sequestration modeling program. The system may further compare the data inputted by the landowner with the data from the database to identify potential errors or mis-entries, which preferably may be flagged for independent review.

The carbon sequestration modeling program then can calculate the available carbon reservoir, the incremental carbon stored since 1990 and the incremental carbon projected to be stored for a specified time period into the future, based on continuing the current land management practices and projecting other variables not dependent on the landowner, all as described above. The results can be subjected to an uncertainty analysis, preferably a Monte Carlo uncertainty analysis, again as described above. Accrued and projected standardized CERCs can be calculated and compiled, with other incremental carbon storage being quantified and held in a reserve pool.

The results of the analysis can be communicated to the landowner, preferably in a report and more preferably in a report directly through the interface. Preferably, the system can allow the landowner an opportunity to run the analysis multiple times for future scenarios, with the landowner or another selectively changing one or more of the variables, in order to determine the impact of the change on the generation of standardized CERCs. For example, the landowner may desire to analyze the impact of changing the type of crops planted, the amount of fertilizer used, the frequency of irrigation, the level of tillage, the time of harvest, etc. The system allows the farmer to input any variable, or combination of variables, run the analysis and receive a report quantifying projected standardized CERCs. More preferably, the system identifies the variables that the landowner is able to change, identifies multiple choices for that variable and provides a mechanism for the landowner to select one or more of the choices.

In a more preferred embodiment, the system comprises a computer interface with the landowner, in which the landowner is requested to input requested information regarding the location of the parcel of land and land management practices employed on an annual basis since at least as early as 1990. More preferably, the information is requested in the form of multiple choice responses to particular inquires of land management practices. The system can take the information inputted from the landowner, identify and obtain relevant information from the database, submit the landowner and database information into a carbon sequestration modeling program, submit the results to an uncertainty analysis program, calculate accrued and projected standardized CERCs available for trade, as well as accrued and projected reserve CERCs, and generate a report for the landowner.

In an even more preferred embodiment, the landowner can input requested site-specific data via a website. The inputted data can be electronically transferred, along with relevant data retrieved from the electronically stored database containing the other site-specific data, if available, and general data relevant to that land parcel, to a carbon sequestration modeling program and to an uncertainty analysis program. From the results, standardized CERCs can be quantified, whether accrued or projected, and placed in a compilation of other standardized CERCs from other landowners. Results that do not meet the standards for a standardized CERC are placed in a compilation of other similar results and held as a reserve or indemnification pool. The compilation of standardized CERCs can be offered for trade on the open market.

More specifically, a more preferred embodiment of the invention comprises linkages between at least four components: 1) a website to obtain information from, and disseminate information to, one or more landowners; 2) a database structure to store collected information from the one or more landowners; 3) a database structure, such as a general database, to store collected information from other sources relevant to carbon sequestration; and 4) one or more data processors adapted to run a carbon sequestration modeling program and/or an uncertainty analysis program. The linkages allow information to be passed between the components, and allow that actions in one component, such as the submission of a request from the website to "quantify the standardized CERCs," initiate a sequence of actions whereby each component performs its designated task in its designated order to produce the desired result.

In the more preferred embodiment, the linkages operate automatically through a collection of computer programs, scripts and daemons, which together pass the needed information between the components and initiate the desired actions. For example, when the landowner submits a request to quantify the standardized CERCs, the database transfers the landowner's input data in a specific format to a specific directory on the computer running the carbon sequestration model. A daemon in that computer watches for information to appear and, when finding data in the input directory, initiates a master script program. The master script program calls a geographic information system routine to process the site location of the land parcel and obtain stored values in the database for general data, such as soil texture, climate and general land use history. These obtained values are placed in a data directory and control is returned to the master script. The master script then calls a set of Perl scripts which parse the appropriately formatted input files required by the carbon sequestration model. The master script calls the carbon sequestration model to perform its program and then the uncertainty analysis program to perform its program. The results are placed into a special output directory in specifically formatted files and the master script deletes the input files to prevent the initiation of another run. A different daemon watches for output files to appear and, when such output files are found, it calls a script to parse and interpret the results and a final report file containing the standardized CERCs and uncertainty is produced. Another daemon on the database system watches for this output file, transfers the results into the database and notifies the landowner by an appropriate method that the results are completed and may be viewed, e.g., on the website.

Another embodiment of the invention comprises an apparatus to generate and quantify standardized CERCs, which may include an interface with the landowner, a data structure adapted to store data relevant to carbon sequestration, such as land use history, soil texture and climate data, a data processor adapted to run a carbon sequestration modeling program, a data processor adapted to run an uncertainty analysis program and a mechanism to generate and provide a report to the landowner. The apparatus preferably is designed to allow individual landowners, or groups of landowners, to input requested information and receive reports quantifying accrued and projected standardized CERCs, as well as CERCs to be held in reserve.

Figure 5:
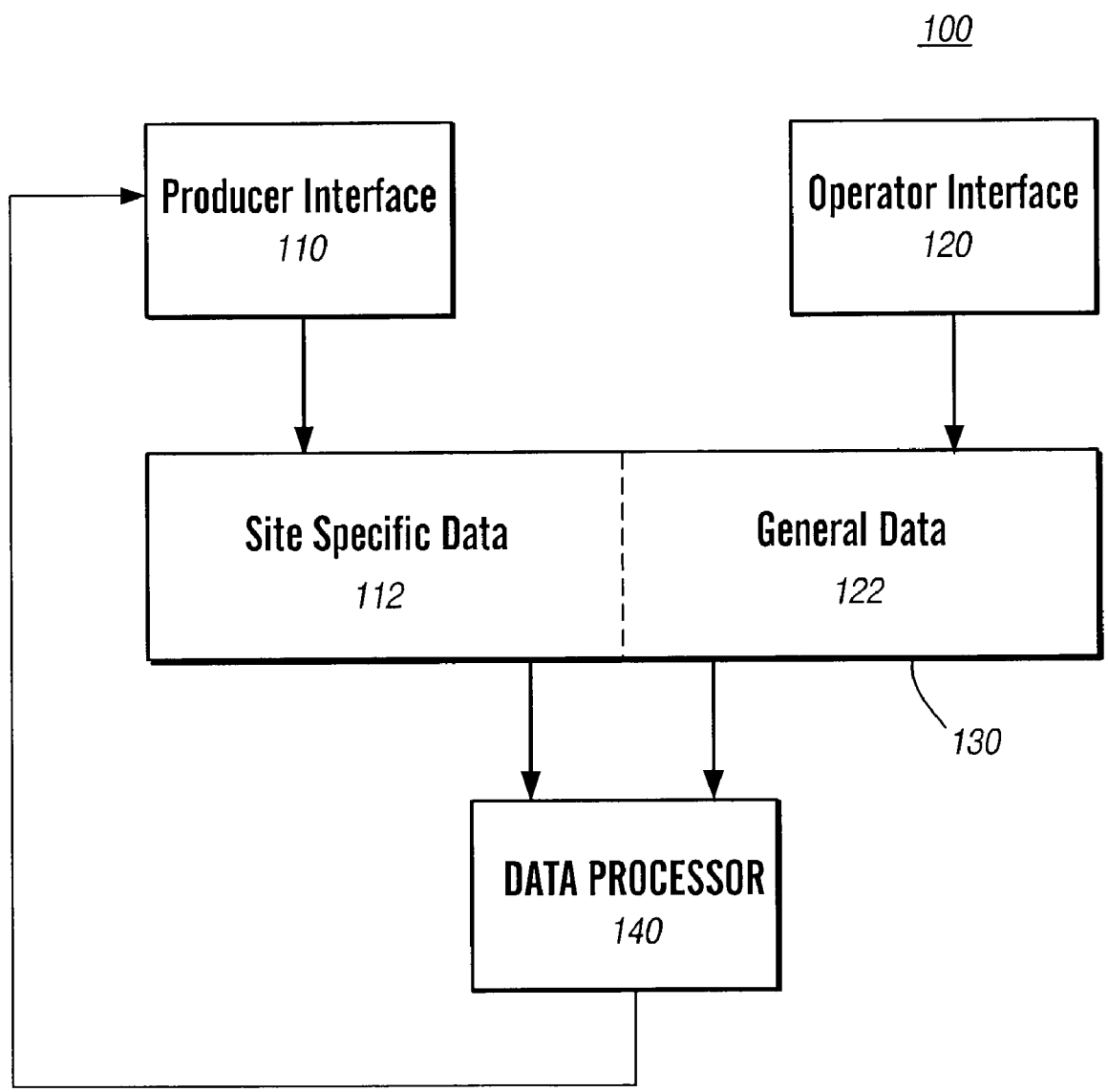
FIG. 5 depicts an apparatus of the present invention to generate standardized carbon emission reduction credits.

Referring now to FIG. 5, an apparatus 100 comprises a producer interface 110, an operator interface 120, a data structure 130 and a data processor 140. Preferably, the producer interface 110 is adapted to receive data input by a potential CERC producer, more preferably in response to particular inquiries regarding the geographic location and size of the land parcel and its land use history. The producer interface 110 also preferably is adapted to receive a report from the data processor 140 and provide it to the potential CERC producer. The operator interface 120 is adapted to receive data by an operator, preferably geographically referenced general data relating to factors having an impact on carbon sequestration, such as climate, soil texture and land use history.

The data structure 130 is adapted to receive and store data from the producer interface 110 and preferably also is adapted to receive and store data from the operator interface 120. Alternatively, a separate data structure (not shown) may be used to receive and store data from the operator interface 120. More preferably, the data structure 130 is adapted to receive and store site-specific data 112 from the producer interface 110 and general data 122 from the operator interface 120. As described above, the general data 122 preferably is geographically referenced.

The data processor 140 is adapted to identify the appropriate data from the data structure 130, including the data from the producer interface 110 and the data from the operator interface 120. Preferably, the data processor 140 is adapted to use the input geographic location of the land parcel to identify and obtain geographically referenced general data 122 stored in the data structure 130. The data processor 140 is adapted to use the site-specific data 112 and the identified general data 122 to determine the approximate change in the level of carbon compounds stored in the defined media over a specified period of time, preferably through the operation of a carbon sequestration modeling program.

Preferably, the data processor 140 also is adapted to receive the results of this determination and the data on which they were based and conduct an uncertainty analysis, preferably a Monte Carlo uncertainty analysis, to quantify standardized CERCs and reserve CERCs. Alternatively, a separate data processor (not shown) may be used to conduct the uncertainty analysis. The data processor 140 also may be adapted to generate a report and provide the report to the potential CERC producer, more preferably through producer interface 110.

In another embodiment of the invention, a system to generate, quantify, standardize, pool and trade carbon emission reduction credits is disclosed. This system includes a method and apparatus to obtain data and commitments from one or more potential CERC producer, combine the obtained data with data obtained from other sources, quantify accrued standardized CERCs, projected standardized CERCs, and remaining carbon emission reductions not included in the standardized CERCs and compile accrued and projected standardized CERCs for trade. Preferably, the compiled accrued and projected standardized CERCs are marketed for trade after a certain quantity of such standardized CERCs has been compiled.

The accrued and/or projected standardized CERCs may be marketed or sold through a wide variety of means, including direct solicitation to potential CERC purchasers, advertising, auction, etc. Preferably, the standardized CERCs are placed in the open market for sale or trade via an on-line auction or through one or more on-line auction services.

In another embodiment of the invention, one or more other variables which limit the acceptance of a standardized CERC may be identified, analyzed, estimated or preferably quantified and communicated to the potential CERC purchaser. This can operate to reduce, or preferably remove, a variable for the potential purchaser, thereby increasing its value to the CERC producer.

For example, the CERC requirement of ownership may be analyzed, an uncertainty determined and the conclusion presented to the potential CERC purchaser. Preferably, the landowner is requested to provide information in response to questions directed to ownership and other rights to the land that may have an impact on the ownership of CERCs generated from the prior or future land use. Such inquires may include the identity of all entities with potential rights to ownership, use, occupation, easement, etc. of the land, the nature of such rights and the parties practices. The inputted ownership information is compiled and can be directly communicated to the potential CERC purchaser. Preferably, the inputted ownership information is analyzed, whether by a person or a program, to assess possible ownership issues and to provide a report. Generally, a response that no such other entity exists would decrease the risk of an ownership issue, whereas a positive response would enable a potential CERC purchaser to more accurately assess such a risk.

Similarly, the requirements of leakage and permanence may be included in the determination of establishing a standardized CERC. Preferably additional inquiries are submitted to the landowner designed to identify, ascertain and assess issues related to leakage and/or permanence of any CERCs generated through the management of the parcel of land. For example, to establish permanence, the landowner may be required to certify the practice of a specific agricultural rotation sequence for defined time period. In a more specific example, the landowner may document past land use history and certify the practice of no-till wheat cultivation for three out of the next ten years. Based on landowner submissions, a fraction of the CERCs generated, if any, can be standardized for trade and a fraction can be held in reserve.

An example of the operation of one embodiment of the invention follows. A potential CERC producer accesses a website that includes background and reference material, as well as an interactive interface capable of receiving and transmitting data. In response to an inquiry, the potential CERC producer identifies a parcel of land by geographic location.

The geographic location is utilized to identify the specific land parcel and the total area of the land parcel. The geographic location also is used to obtain general data relevant to carbon sequestration in soil for that land parcel from a database containing geographically referenced general data relevant to carbon sequestration in soil, such as land use history, climate and soil texture. A baseline level of business as usual carbon emissions is also obtained, preferably from a database of such baseline levels referenced by geographic location and/or type of activity, such as farming. The relevant general data is input into a carbon sequestration model to determine whether the carbon reservoir of the soil is full. If it is full, the soil is not capable of satisfying the requirement of additivity and CERCs will not be generated. If the carbon reservoir is not full, the potential CERC producer is prompted to provide additional site-specific data.

The site-specific data requested may depend on the geographic location of the land parcel. Typically, the potential CERC producer would be requested to identity, as accurately and as completely as possible, detailed land use history for each year since 1990, such as 1) the type, planting month and senescence of annual plants on the land; 2) the type, first growth month and senescence of perennial plants on the land; 3) the type of cultivation each month; 4) the type, form and amount of each fertilizer each month; 5) the type and amount of organic matter additions each month; 6) the type and amount of irrigation each month; 7) the type and yield of harvest each month; 8) whether winter grazing or pasture grazing; and 9) if pasture grazing, the type and number of animals grazing each month.

The site-specific data may be tested. For example, if the site-specific data is not complete, the website may prompt the potential CERC producer for additional information. If the site-specific data is still not complete thereafter, the general database may be accessed to determine if general data is available to substitute for the missing site-specific data. If such general data is obtained or used, the uncertainty analysis is adjusted to reflect the greater level of uncertainty of that data. Other tests also may be conducted, such as testing the site-specific data to determine if it falls within prescribed ranges or values of related general data from the database and comparing input data for specific years to satellite-imagery to determine congruence.

The site-specific data, along with the general data relevant to the land parcel obtained from the general database, as well as the baseline level, are input into a carbon sequestration model to determine the approximate change, if any, in the level of carbon compounds stored in the soil since 1990. In this example, the potential CERC producer is only requested to provide data back to 1990, while the database provides all data prior to 1990. Even with the use of such general data, standardized CERCs may be generated and quantified with reasonable and acceptable accuracy by the use of an uncertainty analysis.

The data input and therefore the results of the carbon sequestration model are subjected to an uncertainty analysis, whereby the relative uncertainty of the results can be quantified, based on a desired confidence threshold. The approximate change in the level of carbon compounds in the soil may then be expressed as standardized CERCs and reserve CERCs, accrued since 1990 to the date of the analysis. The results are communicated to the potential CERC producer through the website.

The website also will allow a determination of the amount of future standardized CERCs that may be generated if the CERC producer were to commit to certain actions into the future. For example, in response to inquiries, the potential CERC producer inputs data as to future actions for defined time periods, such as changing to no till agriculture for ten years, or rotating soybeans and corn every other year for eight years, etc. Preferably, the website identifies possible actions that would most increase standardized CERC generation, based on the site-specific data and general data previously entered, and prompts the potential CERC producer to select from one or more of a plurality of choices. The selected data is inputted, the carbon sequestration model program and uncertainty analysis are conducted, future standardized CERCs and future reserve CERCs are quantified and the results are communicated to the potential CERC producer.

The potential CERC producer optionally may request one or more alternative runs to determine the projected number of future standardized CERCs, based on changing selected input variables. The potential CERC producer preferably is given the opportunity to contractually commit to a specific course of action for a specific time period, and is awarded the number of projected future standardized CERCs and reserve CERCs based thereon.

The accrued standardized CERCs are placed into a pool of accrued standardized CERCs with those of other CERC producers, the future standardized CERCs are place into a pool of future standardized CERCs with those of other CERC producers and the reserve CERCs are placed into a reserve pool with those of other CERC producers. These pools, separately or in combination, may be offered for sale, preferably on the open market though competitive bidding.

Because the landowner supplies much of the data used to generate and quantify standardized CERCs, the costs can be reduced. Because a landowner is not required to supply detailed land use history data or other data prior to 1990, and perhaps not even complete data after 1990, and is not required to supply other data such as climate data, greater numbers of landowners can participate in generating CERCs and contributing to a pool of CERCs with other landowners. Because the process to generate and quantify the standardized CERCs is transparent and reproducible, it is well suited for independent verification and auditing by third parties. Because the process is flexible, it may be modified to respond to evolving carbon trading and greenhouse gas reduction policies and regulations and to incorporate evolving technology and science findings. Overall, the method and apparatus of the present invention are designed to facilitate the participation of individual landowners in the CERC market, maximize the value of the CERC generated, increase the price paid to the CERC generator and lower the risk to the CERC purchaser.

The general database described herein may alternatively be used in a variety of resource management related issues. For example, a module can be added that could be linked to soil-erosion and hydrology models. A landowner could then enter the coordinates for a specific land parcel and receive a plan for the specific locations of grassland buffer strips that would decrease soil erosion by specific amounts. Alternatively, a module could be added to generate and quantify standardized CERCs based on capturing methane emissions from manure storage and processing lagoons. These alternative projects share several common elements, including a customized data base, such as a general database, to define important controlling variables, a producer-accessible interface for project-specific data, linkages to data processors adapted to run numerical models and data processors adapted to run uncertainty analyses. These systems are designed to readily adapt to current and evolving regulatory requirements.

The invention also may be advantageously applied to sequestration and/or reduction of emissions of greenhouse gases other than carbon dioxide. These greenhouse gases may include nitrous oxide and methane, or any other greenhouse gas identified by the International Panel on Climate Change (IPCC), regulatory agency or other authority. The invention also may be advantageously applied to reduction of business as usual greenhouse gas emissions and/or sequestration into media other than soil, such as trees, other vegetation, aquatic systems and marine systems.

The invention also may be advantageously applied where CERCs are produced as a consequence of substitution of renewable carbon, such as biomass and/or methane from landfills, for fossils fuels. The specific module would be designed to define the CERC production and uncertainty to normalize their value and document their compliance with regulatory requirements.

In another embodiment of the invention, one or more of the methods described herein can be used to quantify and normalize CERC generation for businesses engaged in carbon sequestration projects or to other greenhouse gas mitigation efforts, including, e.g., emissions of methane from animal feedlots and manure storage facilities. Modules can be added to quantify CERCs that will meet the regulatory requirements for documenting CERC generation for those applications. This reduces and preferably eliminates uncertainty for the potential CERC purchaser, thereby increasing the value of the CERC to the CERC producer.

In yet another embodiment of the invention, one or more of the methods described herein can be used by those who regulate and/or report greenhouse gas emissions and/or mitigation efforts. This would provide verification of local, regional, national and international greenhouse gas reduction efforts.

A number of variations and modifications of the invention can be used. It would be possible to provide for some features of the invention without providing others.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

I claim:

1. A computer-based method of generating standardized carbon emission reduction credits for sequestration of carbon compounds, comprising:
    receiving with a computer system data specific to a first parcel of land and relevant to carbon sequestration;
    retrieving with the computer system data general to the geographic region encompassing the first parcel of land and relevant to carbon sequestration;
    processing the data specific to the first parcel of land and the data general to the geographic region encompassing the first parcel of land with a carbon sequestration model running on the computer system to determine a change of the level of carbon compounds stored in the soil of the first parcel of land over a first specified time period;
    conducting with the computer system an uncertainty analysis on the determined change of the level of carbon compounds stored in the soil in the first parcel of land over the first specified time period, wherein the uncertainty analysis produces an uncertainty data based at least in part on the data specific to the first parcel of land;
    identifying with the computer system a total number of carbon emission reduction credits for the first parcel of land comprising a first quantity of standardized carbon emission reduction credits and a first quantity of reserve carbon emission reduction credits, wherein the first quantity of reserve carbon emission reduction credits is a fraction of the total number that is designated as unavailable for trade with the fraction being selected based on the uncertainty data determined by the uncertainty analysis; and
    outputting a report including the first quantity of standardized carbon emission reduction credits and the first quantity of reserve carbon emission reduction credits.

2. The method of generating standardized carbon emission reduction credits of claim 1, wherein the data specific to the first parcel of land comprises land use history data for the first specified time period received via a user interface provided on a user node by the computer system.

3. The method of generating standardized carbon emission reduction credits of claim 1, wherein the data general to the geographic region encompassing the first parcel of land comprises at least one of land use history data, climate data and soil texture data and the retrieving comprises accessing a data base In memory by the computer system.

4. The method of generating standardized carbon emission reduction credits of claim 1, wherein the data specific to the first parcel of land comprises data beginning from the year 1990.

5. The method of generating standardized carbon emission reduction credits of claim 1, wherein the data general to the geographic region encompassing the first parcel of land comprises data from at least as early as the year 1990.

6. The method of generating standardized carbon emission reduction credits of claim 1, wherein the first specified time period begins with the year 1990.

7. The method of generating standardized carbon emission reduction credits of claim 1, wherein the first specified time period begins with the year 1990 and ends with the year of identifying the first quantity of standardized carbon reduction emission credits.

8. The method of generating standardized carbon emission reduction credits of claim 1, wherein the first specified time period begins with the year 1990 and ends at a selected year into the future.

9. The method of generating standardized carbon emission reduction credits of claim 1, wherein the firsts specified time period begins with the year of identifying the first quantity of standardized carbon reduction emission credits and ends at a selected year into the future.

10. The method of generating standardized carbon emission reduction credits of claim 1, wherein the first specified time period begins with the year of identifying the first quantity of standardized carbon reduction emission credits and ends 20 years thereafter.

11. The method of generating standardized carbon emission reduction credits of claim 1, further comprising comparing the data specific to the first parcel of land to the data general to the geographic region encompassing the first parcel of land and based on the comparing reporting missing, incomplete, or improperly entered portions of the data specific to the first parcel of land.

12. The method of generating standardized carbon emission reduction credits of claim 1, further comprising:
    providing data specific to a second parcel of land and relevant to carbon sequestration to the computer system;
    with the computer system, retrieving data general to the geographic region encompassing the second parcel of land and relevant to carbon sequestration;
    processing the data specific to the second parcel of land and the data general to the geographic region encompassing the second parcel of land with the carbon sequestration model to determine a change of the level of carbon compounds stored in the soil of the second parcel of land over a second specified time period;
    conducting with the computer system an uncertainty analysis on the determined change of the level of carbon compounds stored in the soil in the second parcel of land over the second specified time period, wherein the uncertainty analysis produces an uncertainty data based at least in part on the data specific to the second parcel of land and that differs from the uncertainty determined for the first parcel of land;
    identifying with the computer system a total number of carbon emission reduction credits for the second parcel of land comprising a second quantity of standardized carbon emission reduction credits and a second quantity of reserve carbon emission reduction credits that is a fraction of the total number that is selected based on the uncertainty determined by the uncertainty analysis for the second parcel of land;
    compiling the first quantity of standardized carbon emission reductions credits and the second quantity of standardized carbon emission reduction credits into a primary pool available for trade;

compiling the first quantity of reserve carbon emission reductions credits and the second quantity of reserve carbon emission reduction credits into a reserve pool identified as unavailable for trade;

outputting a report including results of the compiling step.

13. A method of generating standardized carbon emission reduction credits comprising:

with a computer linked to a communications network, obtaining data for a first parcel of land through an interactive interface accessed on a computer node linked to the communications network by a potential producer of carbon emission reduction credits;

obtaining data with the computer from a database in memory containing data relevant to carbon sequestration for the first parcel of land;

inputting selected data obtained from the potential producer and from the database into a carbon sequestration model running on the computer;

determining a change in the level of carbon compounds in the soil in the first parcel of land over a first specified time period;

conducting with the computer an uncertainty analysis to calculate a set of carbon emission reduction credits for the first parcel of land based on the determined change in the level of carbon compounds including a quantity of standardized carbon emission reduction credits available for trading and a quantity of reserve carbon emission reduction credits unavailable for trading, the quantity of reserve carbon emission reduction credits being a fraction of the set of carbon emission reduction credits chosen based on results of the uncertainty analysis; and operating the computer to display a report on the interactive interface including at least the quantity of standardized carbon emission reduction credits.

14. The method of generating standardized carbon emission reduction credits of claim 13, wherein the data obtained from the potential producer comprises data beginning from the year 1990.

15. The method of generating standardized carbon emission reduction credits of claim 13, wherein the database comprises data from at least as early as the year 1990.

16. The method of generating standardized carbon emission reduction credits of claim 13, wherein the first specified time period begins with the year 1990.

17. The method of generating standardized carbon emission reduction credits of claim 13, wherein the first specified time period begins with the year 1990 and ends with the year of identifying the first quantity of standardized carbon reduction emission credits.

18. The method of generating standardized carbon emission reduction credits of claim 13, wherein the first specified time period begins with the year 1990 and ends at a selected year into the future.

19. The method of generating standardized carbon emission reduction credits of claim 13, wherein the first specified time period begins with the year of identifying the first quantity of standardized carbon reduction emission credits and ends at a selected year into the future.

20. The method of generating standardized carbon emission reduction credits of claim 13, wherein the specified time period begins with the year of identifying the first quantity of standardized carbon reduction emission credits and ends 20 years thereafter.

21. The method of claim 13, wherein the first specified time period comprises a period of time before the obtaining of the data through the interactive interface and further comprising conducting an uncertainty analysis to identify a first quantity of future standardized carbon emission reduction credits and a first quantity of future reserve carbon emission reduction credits for a time period extending from the obtaining of the data through the interactive interface to a selected date in the future.

22. The method of claim 13, further comprising:

changing at least one value for at least one of the selected data inputted into the carbon sequestration model to determine an alternative change in the level of carbon compounds in the soil in the first parcel of land over the specified time period; and conducting an uncertainty analysis to identify a first quantity of alternative standardized carbon emission reduction credits and a first quantity of alternative reserve carbon emission reduction credits, wherein the quantity of alternative reserve carbon emission reduction credits are selected based on the conducted uncertainty analysis; and outputting a report including results of the compiling step.

23. The method of claim 13, wherein the interactive interface comprises at least one of verbal, written and digital responses to inquiries for data for the parcel of land.

24. The method of claim 13, wherein the interactive interface comprises at least one of verbal, written and digital inquires for response by the potential producer of carbon emission reduction credits.

25. The method of claim 13, wherein the interactive interface comprises digital responses to digital inquires for data for the parcel of land.

26. The method of claim 13, further comprising:

obtaining data for a second parcel of land through an interface with a second potential producer of carbon emission reduction credits;

obtaining data from a database containing data relevant to carbon sequestration for the second parcel of land;

inputting selected data obtained from the potential producer and selected data from the database into a carbon sequestration model to determine the change in the level of carbon compounds in the soil in the second parcel of land over a second specified time period;

conducting an uncertainty analysis to identify a second quantity of standardized carbon emission reduction credits and a second quantity of reserve carbon emission reduction credits;

compiling the first quantity of standardized carbon emission reductions credits and the second quantity of standardized carbon emission reduction credits into a primary pool;

compiling the first quantity of reserve carbon emission reductions credits and the second quantity of reserve carbon emission reduction credits into a reserve pool; and outputting a report including results of the compiling step.

27. A computer-based method of generating and compiling a quantity of standardized carbon emission reduction credits for at least two parcels of land comprising;

operating a data processor for obtaining general data and site-specific data relevant to carbon sequestration for a first parcel of land;

processing with the data processor the general data and site-specific data for the first parcel of land with a carbon sequestration model to determine a level of carbon compounds in the first parcel of land;

when the level is determined to show a possibility of additivity for the first parcel of land, determining with the data processor the change in level of carbon compounds in the first parcel of land over a first specified time period;

conducting with the data processor an uncertainty analysis to identify a first quantity of standardized carbon emission reduction credits and a first quantity of reserve carbon emission reduction credits, the reserve carbon emission reduction credits being credits unavailable for trade and having a number based on uncertainty data determined based upon the determined change in level of carbon compounds;

compiling with the data processor the first quantity of standardized carbon emission reduction credits into a primary pool available for trade and the first quantity of reserve carbon emission reduction credits into a reserve pool;

operating the data processor for obtaining general data and site-specific data relevant to carbon sequestration for a second parcel of land;

processing with the data processor the general data and site-specific data with the carbon sequestration model to determine a level of carbon compounds in the second parcel of land;

determining the change in level of carbon compounds in the second parcel of land over a second specified time period;

conducting with the data processor an uncertainty analysis to identify a second quantity of standardized carbon emission reduction credits and a second quantity of reserve carbon emission reduction credits associated with the second parcel of land based on a determined uncertainty data with the determined change in level of carbon compounds for the second parcel of land;

compiling with the data processor the second quantity of standardized carbon emission reduction credits into the primary pool and the second quantity of reserve carbon emission reduction credits into the reserve pool; and generating a report defining contents of the primary pool and the reserve pool.

28. The method of claim 27, wherein the first specified time period begins with the year 1990.

29. The method of claim 27, wherein the second specified time period begins with the year 1990.

30. The method of claim 27, wherein the first specified time period begins with the year 1990 and ends at a selected year into the future.

31. The method of claim 27, wherein the second specified time period begins with the year 1990 and ends at a selected year into the future.

32. The method of claim 27, wherein the first specified time period begins with the year of generating standardized carbon emission reduction credits and ends 20 years thereafter.

33. The method of claim 27, wherein the second specified time period begins with the year of generating standardized carbon emission reduction credits and ends 20 years thereafter.

34. An apparatus to generate a quantity of standardized carbon emission reduction credits, comprising:

an interface provided on a user node linked to a communications network adapted to receive data relevant to carbon sequestration from, and to disseminate information to, a potential producer of standardized carbon emission reduction credits;

a data structure stored in memory accessible via the communications network adapted to receive and store data relevant to carbon sequestration in addition to the data received by the interface; and data processing means linked to the communications network adapted to receive data from the interface and data from the data structure to determine a the-approximate change in the level of carbon compounds stored in a media, to conduct an uncertainty analysis including determining an uncertainty data in the determined approximate change in the level of carbon compounds, and to identify a first quantity of standardized carbon emission reduction credits based on the determined uncertainty data to set aside a number of carbon emission reduction credits that are identified as not being suited for trading due to the determined uncertainty.

35. The apparatus of claim 34, further comprising processing means to select appropriate data stored in the data structure based on the data received from the potential producer.

36. The apparatus of claim 34, wherein the interface is a website.

37. The apparatus of claim 34, wherein the interface comprises at least one inquiry allowing the potential producer to respond by selecting one or more of a plurality of provided choices.

* * * * *